United States Patent [19]

Schroeder et al.

[11] Patent Number: 5,308,490

[45] Date of Patent: May 3, 1994

[54] SEWAGE DELIVERY FOR AN ACTIVATED SLUDGE PROCESS

[75] Inventors: Markus Schroeder; Dietmar Loch; Bernhard Woeffen, all of Aachen; Joost Groeneweg, Kreuzau; Carl J. Soeder, Dortmund, all of Fed. Rep. of Germany

[73] Assignee: Forschungzentrum Juelich GmbH, Juelich, Fed. Rep. of Germany

[21] Appl. No.: 982,730

[22] Filed: Nov. 27, 1992

Related U.S. Application Data

[63] Continuation of Ser. No. 707,135, May 31, 1991.

[30] Foreign Application Priority Data

May 31, 1990 [DE] Fed. Rep. of Germany ....... 4017529

[51] Int. Cl.$^5$ ............................................. C02P 3/30
[52] U.S. Cl. .................... 210/605; 210/630; 210/200; 210/209; 210/257.1; 210/262; 210/903
[58] Field of Search .............. 210/172, 200, 202, 209, 210/219, 253, 257.1, 261, 262, 605, 620, 630, 903; 137/255, 256, 263, 266

[56] References Cited

U.S. PATENT DOCUMENTS

| | | | |
|---|---|---|---|
| 482,052 | 9/1892 | Wilson | 210/200 |
| 749,825 | 1/1904 | Priestman | 137/263 |
| 1,564,962 | 12/1925 | Kelly et al. | 137/256 |
| 2,362,674 | 11/1944 | Spangler et al. | 137/256 |
| 3,467,118 | 9/1969 | Gerwick, Jr. et al. | 137/256 |
| 3,470,092 | 9/1969 | Bernard | 210/620 |
| 3,714,036 | 1/1973 | Slater | 210/253 |
| 4,179,366 | 12/1979 | Kaelin | 210/620 |
| 4,655,925 | 4/1987 | Tabata et al. | 210/605 |
| 4,663,044 | 5/1987 | Goronszy | 210/610 |
| 4,793,930 | 12/1988 | Soeder et al. | 210/614 |
| 4,952,316 | 8/1990 | Cooley | 210/626 |
| 4,966,705 | 10/1990 | Jamieson et al. | 210/605 |
| 5,019,266 | 5/1991 | Soeder et al. | 210/605 |

FOREIGN PATENT DOCUMENTS 299590 3/1915 Fed. Rep. of Germany.
941302 8/1912 France.

*Primary Examiner*—Christopher Upton
*Attorney, Agent, or Firm*—Foley & Lardner

[57] ABSTRACT

A plant suitable, in particular, for denitrifying sewage purification by the activated sludge process comprises several tanks which are charged with untreated water via a common delivery conduit which is preferably designed as a ring main. This delivery conduit, which is arranged above the maximum water level in the tanks, has an essentially horizontal course and serves as storage space for the sewage feed to the individual tanks via rapid-closing and -opening gate valves for spontaneous or gravitational emptying into the particular tank. The delivery conduit is preferably designed as a closed double channel with a lower discharge conduit, which is located below the minimum water level in the tanks, for discharging the sludge/water mixture to the final clarification tank. It is expedient to include an operation bridge or walkway with the delivery conduit.

22 Claims, 4 Drawing Sheets

SEWAGE DELIVERY FOR AN ACTIVATED SLUDGE PROCESS

This application is a continuation of application Ser. No. 07/707,135, filed May 31, 1991.

BACKGROUND OF THE INVENTION

The present invention relates to an arrangement for sewage clarification by the activated sludge process, in particular with denitrification.

Sewage purification by the activated sludge process is normally carried out in large aeration tanks which are charged via delivery conduits having control weirs. Where appropriate, the large aeration tanks are charged from a preliminary clarification tank via inverted siphons to equalize the sewage flow.

A particularly useful type of sewage purification by the activated sludge process which provides successful denitrification and avoids formation of sludges which are difficult to settle is described in U.S. Pat. No. 4,793,930 and U.S. patent application Ser. No. 07/174,386, now issued as U.S. Pat. No. 5,019,266. According to this process, sewage is added at regular time intervals and in pulses of limited duration to the aeration tank, and for simultaneous denitrification the aeration is switched off or cut back until anoxic conditions are present. During this anoxic phase, nitrate present in the tank is substantially consumed, and sufficient reduction in the concentration thereof triggers resumption of aeration in the tank.

SUMMARY OF THE INVENTION

It is an object of the present invention to provide a sewage delivery conduit common to a plurality of aeration tanks, wherein the delivery conduit has adequately large dimensions and is positioned at an adequate height, such that sewage storage and rapid emptying appropriate for intermittent operation is possible in one of the tanks in each case.

In accomplishing the foregoing objects, there is provided according to the present invention an arrangement for an activated sludge process with denitrification comprising a plurality of separate aeration tanks and a delivery conduit for introducing sewage into the tanks, wherein the delivery conduit is arranged above and parallel to the maximum liquid level in the tanks, has sufficient holding space for the sewage feed and is provided with a plurality of gate valves for controlling the introduction of the sewage into each tank. The present invention further includes means for introducing sewage from the delivery conduit at predetermined time intervals and in pulses of predetermined duration into one of the aeration tanks, as described in U.S. Pat. No. 4,793,930 and U.S. patent Ser. No. 07/174,386, now issued as U.S. Pat. No. 5,019,266, both of which are incorporated herein by reference. U.S. Pat. No. 4,793,990 teaches a waster water purification process in which there is a controlled batch-wise wastewater feed into a single aeration tank. Generally, the feed volume per cycle is between 5% and 30%, specifically in the vicinity of between 10% and 20% of the volume of the aeration tank. The length of time when the waste water may flow into the tank is between 0.5 and 5 minutes at intervals of between one and a half and two hours. In this manner, the formation of bulking sludge is suppressed, and a uniform treatment efficiency is achieved. Similarly, U.S. Pat. No. 5,019,266 describes a waste water purification process in which batch-wise supply of waste water is delivered to an activated sludge tank in amounts less than or equal to 30% of the tank volume, and in particular between about 5% and 20% of the tank capacity. In the case of urban types of waste water, delivery generally occurs at 1 hour intervals and over a period of between 0.5 and 5 minutes, with 2 minutes being preferred. Preferably, the delivery conduit comprises a double channel which includes an upper channel for introducing sewage into the tanks and a lower discharge conduit.

Further objects, features and advantages of the present invention will become apparent from the detailed description of preferred embodiments that follows.

BRIEF DESCRIPTION OF THE DRAWINGS

The present invention is explained in more detail with reference to a specific embodiment which is described in connection with the attached drawing wherein.

DETAILED DESCRIPTION OF THE PREFERRED EMBODIMENTS

The arrangement according to the present invention includes a plurality of individual tanks which are charged with sewage via a common delivery conduit, wherein the delivery conduit is arranged above and substantially parallel to the maximum water level of the tanks is designed as a storage space for the sewage feed and is provided with rapid-opening gate valves for spontaneous or gravitational emptying into a particular tank. The sewage feed takes place in pulses.

The delivery conduit of the present invention, through which return sludge is transported as well as acts as a distributor and reservoir for rapid emptying and has appropriate storage capacity especially adapted to the feeding pulses of batchwise spontaneously introducing sewage into one tank each. It can be designed in any suitable shape, such as a star or spoke shape, or with bifurcations. A delivery conduit in the shape of a ring main connecting the individual tanks, however, is particularly expedient.

A channel of this type makes possible not only storage and spontaneous delivery with the aim of optimizing the denitrification, but also the retention of peak flows for example, peak $NH_4$-N supply, and metered delivery in times of low supply. Thus, the holding capacity of the delivery conduit could amount e.g. to about 40% of that of one tank. Generally, the feed volume per cycle should be between 5% and 30%, and more specifically in the vicinity of between 10% and 20% of the volume of the aeration tank.

It is expedient, for complete emptying of the contents of the delivery conduit, especially during inflow surge in the above-mentioned intermittent activated sludge process, to have the bottom of the conduit be positioned above the maximum water level in the tanks which is defined by the position of a movable or adjustable overflow weir.

In a preferred embodiment, the delivery conduit includes a separated or divided double channel, wherein the upper channel is a sewage delivery or supply channel as described previously and the lower channel is arranged below the minimum water level in the tanks specified by the appropriate position of the weir and serves as a discharge conduit for the sludge/water mixture into the settling or final clarification tank or tanks. Preferably, the upper and lower channels are in the form of an enclosed elongated structure having openings only for the introduction and discharge of sewage. The upper and lower channels can be contiguous with each other, that is, share a common wall, or they can be spaced apart. The upper and lower channels can each have similar or disparate capacity.

An operating bridge or walkway which can be walked on preferably is included in the single-story delivery conduit or the multi-story double channel delivery conduit.

The closed ring and the particular design of the channel make it possible to take individual tanks out of operation (emergency bypass) without interfering with the sewage purification process.

Figure 1:
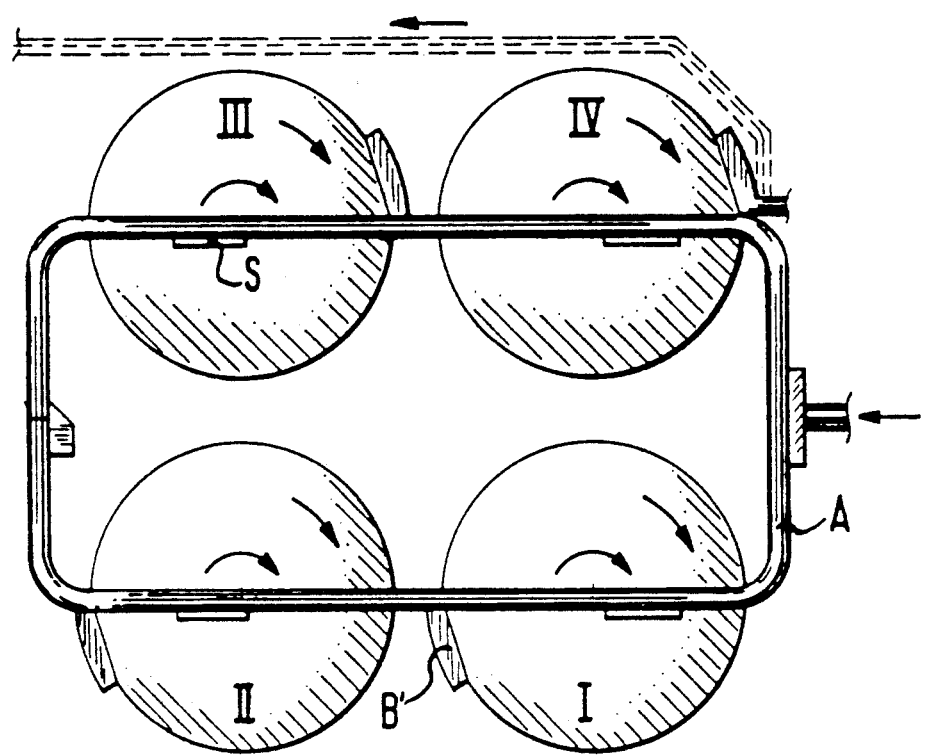
FIG. 1 is a plan view of the arrangement of tanks and ring main according to the present invention.

FIG. 1 shows an arrangement of four aeration tanks (I–IV) which are charged in successive pulses via a ring main or channel A with sewage by spontaneous or gravitational emptying, preferably within a few minutes, into one of the tanks upon actuation of a rapid-opening and -closing lowering gate valve S. Generally, delivery occurs at 1 hour intervals and over a period of between 0.5 and 5 minutes, with 2 minutes being preferred. At least one gate valve S is provided for each tank. These gate valves can, as shown, be provided on the side or in the bottom of the channels. Typically, channel A is arranged horizontally. That is, channel A or the surface level plane of the sewage in channel A is substantially parallel to the surface level plane of the sewage in the aeration tank or the plane in which the bottom of the aeration tank lies. The bottom of channel A, however, can be inclined slightly towards the aeration tank in the vicinity of the emptying points. B' denotes the discharge line to final clarification via the lower channel B.

Figure 2:
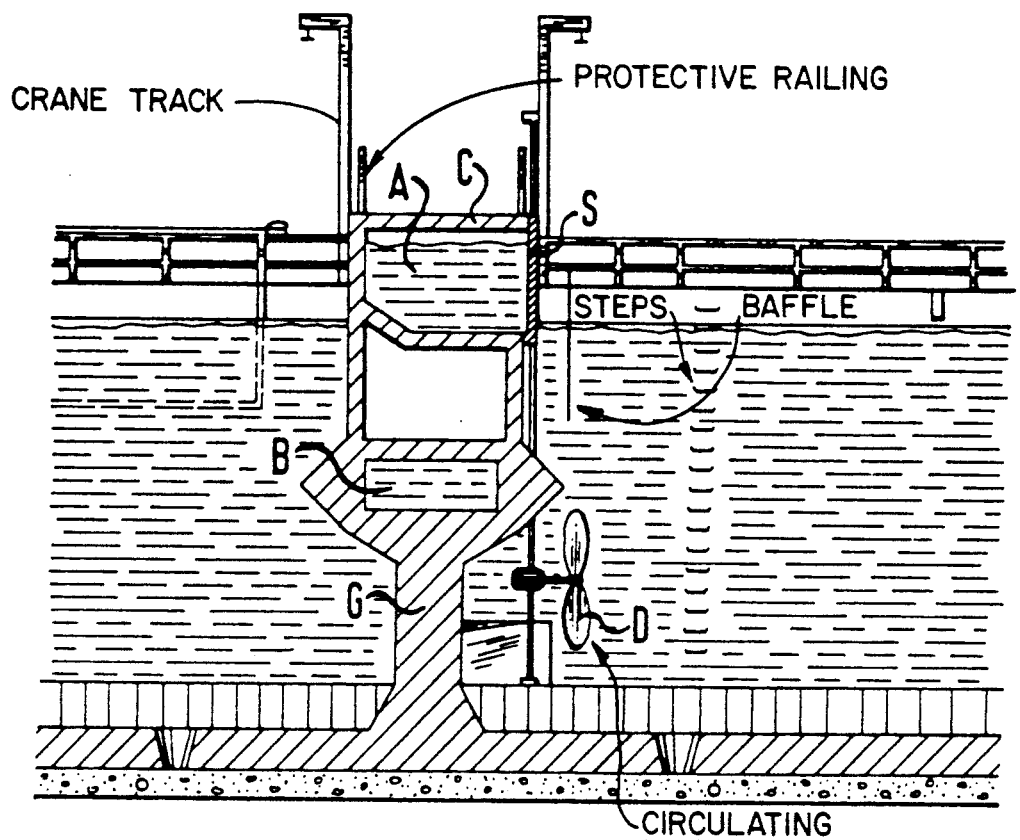
FIG. 2 is a sectional view of a two story channel with an operating bridge according to the present invention.

FIG. 2 shows the double channel embodiment according to the present invention, in which a supply channel A with high storage capacity is provided over a channel B which is arranged beneath the minimum water level, and through which the treated sewage is passed to the final clarification tanks. In this embodiment channels A and B are connected to each other only via a beam structure G, thereby allowing the tank water to circulate freely between them. An operation bridge C is located above the two story channel. This design offers the opportunity of securely suspending devices for circulating the water such as D, and of dismounting the devices D for maintenance purposes.

The tank aeration is distributed over the bottom of the tank and is not depicted in detail here.

Figure 3:
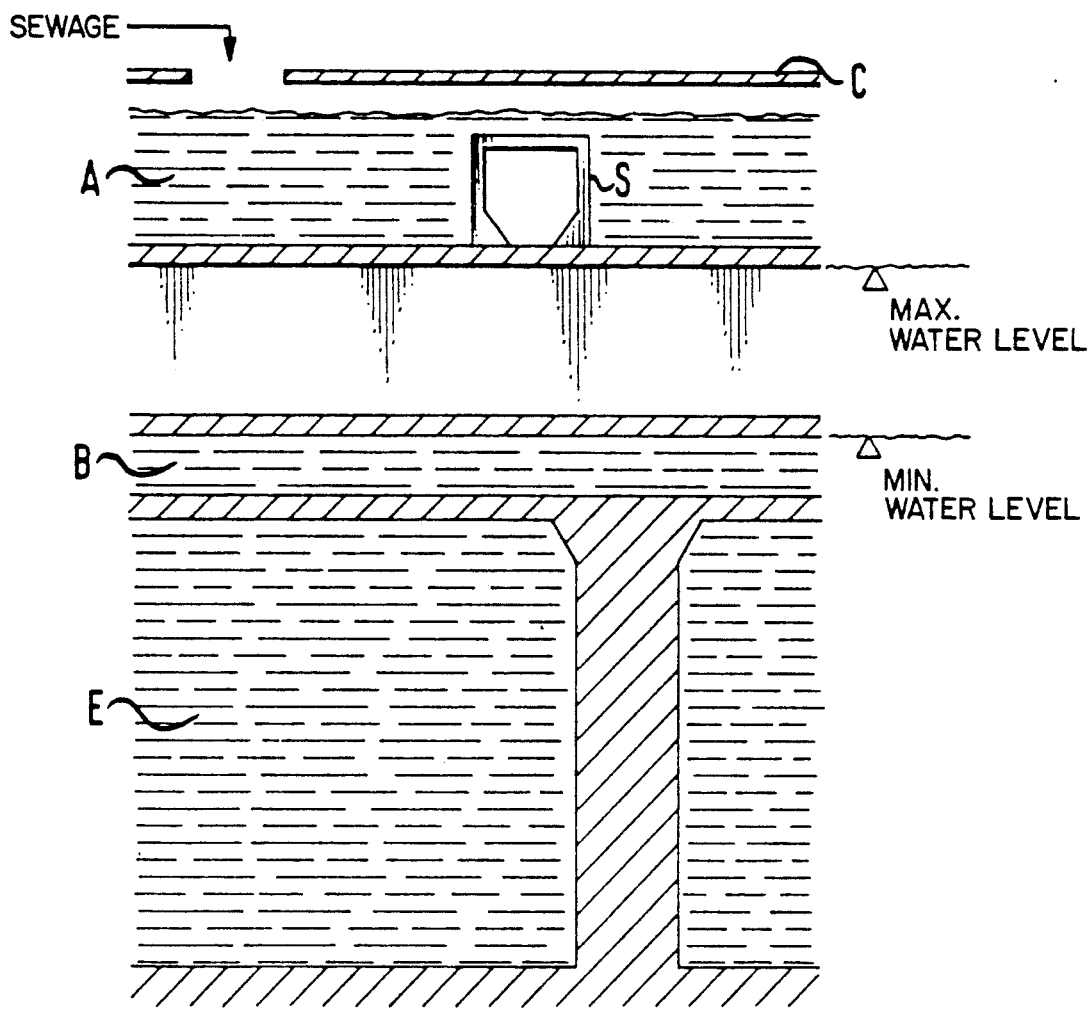
FIG. 3 is a sectional diagrammatical view of the embodiment shown in FIG. 2 viewed in the direction perpendicular to the viewing plane of FIG. 2.

FIG. 3 illustrates the minimum and maximum water levels in the aeration tank E which are fixed by a movable or adjustable overflow weir which is not depicted. The discharge from the aeration tanks can be equalized by controlling the position of the weir. FIG. 3 also shows diagrammatically the lowering gate valve S, which is designed as a panel gate valve, of the upper channel A for rapid discharge of the enclosed sewage into the tank E.

Figure 4:
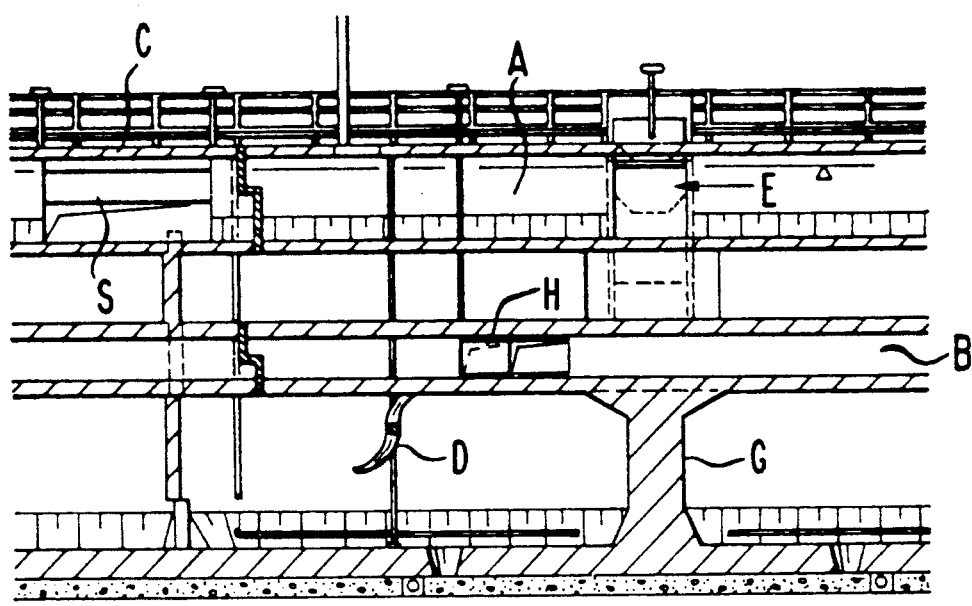
FIG. 4 is a more detailed sectional view of the embodiment shown in FIG. 3.

FIG. 4 shows a regulating gate valve F in the upper channel A. The water/sludge mixture flows through the lower channel B to the final clarification tank. Lower channel B contains a reversing valve H which permits individual tanks to be removed from operation by preventing flow-back from the other tanks. Thus, individual tanks can be removed from operation independently of the procedure described above.

In the process according to the invention with batchwise addition of wastewater, the aeration is throttled or discontinued during the rapid addition of waste water, and specifically until such time as the nitrate falls below a certain nitrate limit value in the tank. During this first anoxic phase, the nitrate in the tank (present from the preceding phase) is rapidly degraded. During the subsequent aeration phase ammonium introduced with the batch of waste water is oxidized to nitrite or nitrate. These compounds are then eliminated in turn by denitrification during the next batchwise addition of waste water and throttling or shutting off of the oxygen supply. For these purposes, a nitrate measuring instrument is provided in each activated sludge tank.

What is claimed is:

1. An arrangement for waste water purification by an activated sludge process having intermittent batchwise sewage supply in an urban waste water treatment plant, said arrangement comprising:
   a) a plurality of separate aeration tanks adapted for the purification of waste water by activated sludge under aeration,
   b) a delivery means common to all of said tanks and comprising one or more elongated channels for selectively and alternately introducing sewage into each one of said tanks, wherein said delivery means is arranged in an essentially horizontally extending manner essentially above a portion of each of said tanks and above the maximum liquid level which is attained in the tanks during said activated sludge process, and wherein said delivery means has a holding space for the sewage feed comprising an amount equal to about 5 to about 40% of the volume of one said tanks; and
   c) means for performing intermittent denitrification of said waste water, said denitrification means comprising means for discontinuing aeration and means, associated with said delivery means for intermittently introducing sewage from the delivery means into a selected one of each of said tanks by gravity, said introducing means comprising a plurality of valve members, each of which is disposed over the maximum liquid level attained in a particular tank for discharging a volume of sewage directly from said channel into said tank in an amount equal to about 5% to 40% of the volume of said tank, said channel having a cross-sectional size and said valve members being sufficiently large to discharge said volume of sewage rapidly in a predetermined duration of time short enough so as to maximize denitrification in said tank.

2. An arrangement according to claim 1, wherein the holding space of said delivery means is sufficiently large to accommodate the entire batchwise introduction of sewage into one tank at predetermined time intervals and in pulses of predetermined duration.

3. An arrangement according to claim 1, wherein said delivery means is a delivery conduit in the shape of a ring main.

4. An arrangement according to claim 1, wherein said delivery means is a delivery conduit which comprises a double channel which includes an upper channel for introducing sewage into the tanks and a lower discharge conduit, which is arranged below the minimum water level obtained in the tanks during said process, for discharge of liquid from said tanks to a settling or final clarification tank.

5. An arrangement according to claim 4, wherein the upper channel and the lower discharge conduit are each in the shape of an elongated, enclosed channel.

6. An arrangement according to claim 4, wherein the lower discharge conduit contains at least one reversing valve which is adapted to prevent flow-back between the tanks.

7. An arrangement according to claim 1, further comprising an operation bridge or walkway arranged above said delivery means.

8. An arrangement according to claim 1, wherein said means for introducing sewage comprises at least one gate valve for each of said tanks.

9. An arrangement according to claim 8, where each of said valves is adapted for the emptying of sewage into the respective tank within 0.5 to 5 minutes.

10. An arrangement according to claim 1, further comprising means for circulating the water in at least one of said tanks.

11. An arrangement according to claim 1, wherein said means for introducing sewage comprise valves provided on the side or bottom of said common delivery means, wherein there are neither transfer lines between said valves and said common delivery means nor between said valves and said tanks.

12. An arrangement according to claim 1, wherein said means for performing denitrification comprises a plurality of valve members associated with said delivery means, each of said valve members being of sufficient size to discharge a volume of sewage directly from said channel into one of said tanks in an amount equal to about 10 to 20% of the volume of one of said tanks over a period of between about 0.5 to 5 minutes.

13. An arrangement according to claim 12, wherein each of said valve members comprises a rapidly opening gate valve.

14. An arrangement according to claim 1, wherein said means for performing denitrification comprises a plurality of valve members associated with said delivery means, each of said valve members being of sufficient size to discharge a volume of sewage directly from said channel into one of said tanks in an amount equal to about 10 to 20% of the volume of one of said tanks over a period of about 2 minutes.

15. An arrangement according to claim 1, wherein said plurality of tanks comprises 4 tanks.

16. An arrangement for purifying waste water by an activated sludge process having intermittent batchwise sewage supply in an urban waste water treatment plant, said arrangement comprising:
 (a) a plurality of separate aeration tanks adapted for the purification of waste water by activated sludge under aeration;
 (b) a delivery means common to all of said tanks, in the shape of a first ring main located horizontally above the maximum liquid level which is attained in said tanks during the sludge purification process, said ring main having a volume of about 5 to 40% that of each tank;
 (c) means for emptying the sewage contents of said ring main into said tanks one at a time at predetermined time intervals and in pulses of predetermined duration; and
 (d) common discharge means in the shape of a second ring main which is located horizontally below the minimum liquid level which is attained in the tanks during the sludge purification process;
 wherein said first ring main and said second ring main comprise a single, double-channel ring main having an upper channel for delivery of sewage and a lower channel for discharge of same after processing, said double channel ring main being located so as to pass through said tanks horizontally and in such a way as to maintain said upper channel above the maximum liquid level attained in said tanks during said process, and said lower channel below the minimum liquid level obtained in said tanks during said process, said upper and lower channels being connected to one another by means of a discontinuous beam which allows the sewage to circulate freely between said upper and lower channels and which facilitates attachment of auxiliary devices within the tank.

17. An activated sludge process for waste water purification by an activated sludge process having intermittent batchwise sewage supply in an urban waste processing installation, said process comprising the steps of:
 a) aerating waste water and activated sludge contained in at least one of a plurality of separate activated sludge tanks;
 b) monitoring the nitrate level within said activated sludge tanks;
 c) introducing sewage into a delivery means, common to all of said tanks, comprising one or more elongated channels for selectively and alternately introducing sewage into each one of said tanks, wherein said common delivery means is arranged in an essentially horizontally extending manner essentially above a portion of each of said tanks and above the maximum liquid level which is attained in the tanks during said activated sludge process, and wherein said delivery means has a holding space for the sewage feed comprising an amount equal to about 5 to about 40% of the volume of one said tanks;
 d) performing an intermittent denitrification process in a selected one of said tanks when said nitrate level increases in said selected tank above a first predetermined level, said denitrification processing comprising the steps of:
  d1) discontinuing aeration within said selected tank; and
  d2) intermittently emptying sewage from said delivery means directly into said selected one of said tanks by gravity when said nitrate level in said tank reaches a predetermined level, wherein said sewage is discharged directly into said tank in an amount equal to about 5% to 40% of the volume of one of said tanks over a period of a few minutes by means of a valve on said delivery means and located above said selected tank;
 e) continuing said denitrification process until the nitrate level of said selected tank decreases below a second predetermined level;
 f) resuming aeration in said selected tank; and
 g) repeating steps (b) through (f).

18. An activated sludge process according to claim 17, wherein said sewage is intermittently emptied from said channel into said selected tank in an amount equal to about 10 to 20% of the volume of said selected tank in approximately 0.5 to 5 minutes.

19. An activated sludge process according to claim 17, wherein said sewage is intermittently emptied from said channel into said selected tank in approximately 2 minutes.

20. An activated sludge process according to claim 17, further comprising the step of discharging a sludge/water mixture produced during the process, through a lower discharge conduit, which is arranged below the minimum water level obtained in the tanks during said process, from the aeration tank to a settling or final clarification tank.

21. An activated sludge process according to claim 17, wherein said delivery means is in the shape of a ring main.

22. An activated sludge process according to claim 17, wherein said plurality of tanks comprises 4 tanks.

* * * * *